(12) United States Patent
Shanmugam et al.

(10) Patent No.: US 10,002,058 B1
(45) Date of Patent: Jun. 19, 2018

(54) METHOD AND SYSTEM FOR PROVIDING DISASTER RECOVERY SERVICES USING ELASTIC VIRTUAL COMPUTING RESOURCES

(71) Applicant: Intuit Inc., Mountain View, CA (US)

(72) Inventors: Elangovan Shanmugam, Cupertino, CA (US); Wei Zhou, Fremont, CA (US); Dong The Diep Nguyen, Modesto, CA (US); Luu Tran, Sunnyvale, CA (US); Luis Felipe Cabrera, Bellevue, WA (US); Seth B. de I'Isle, Portland, OR (US)

(73) Assignee: Intuit Inc., Mountain View, CA (US)

( * ) Notice: Subject to any disclaimer, the term of this patent is extended or adjusted under 35 U.S.C. 154(b) by 77 days.

(21) Appl. No.: 14/555,474

(22) Filed: Nov. 26, 2014

(51) Int. Cl.
*G06F 11/00* (2006.01)
*G06F 11/20* (2006.01)

(52) U.S. Cl.
CPC ...... *G06F 11/203* (2013.01); *G06F 2201/805* (2013.01); *G06F 2201/815* (2013.01)

(58) Field of Classification Search
CPC ............ G06F 11/1446; G06F 11/1461; G06F 17/30575; G06F 2009/45595; G06F 11/203; G06F 21/805; G06F 21/815; G06Q 20/085; H04L 47/70
See application file for complete search history.

(56) References Cited

U.S. PATENT DOCUMENTS

| | | | |
|---|---|---|---|
| 6,857,020 B1 * | 2/2005 | Chaar | G06Q 10/10 709/223 |
| 7,359,933 B1 * | 4/2008 | Polen | H04L 67/34 709/203 |
| 7,593,966 B2 * | 9/2009 | Therrien | G06F 11/1448 |
| 8,103,906 B1 * | 1/2012 | Alibakhsh | H04L 67/42 714/13 |
| 8,117,554 B1 * | 2/2012 | Grechishkin | G06F 9/4443 703/23 |
| 8,447,851 B1 * | 5/2013 | Anderson | G06F 11/3006 707/600 |

(Continued)

*Primary Examiner* — Loan L. T. Truong
(74) *Attorney, Agent, or Firm* — Hawley Troxell Ennis & Hawley LLP; Philip McKay

(57) ABSTRACT

A method and system provides disaster recovery services in an expandable environment of virtual computing resources, according to one embodiment. The method and system provide a financial service with a primary financial service system, according to one embodiment. The method and system operate, on virtual computing resources in a second computing environment, a disaster recovery system for the primary financial service system, and the second computing environment is a virtual computing resources service provider computing environment that provides requested quantities of virtual computing resources for use by the disaster recovery system, in exchange for payment, according to one embodiment. If a loss of service for the primary financial service is detected, the method and system execute a secondary financial system from the disaster recovery system, within the second computing environment, by allocating additional virtual computing resources to the disaster recovery system within the second computing environment, according to one embodiment.

33 Claims, 3 Drawing Sheets

(56) References Cited

U.S. PATENT DOCUMENTS

| | | | | |
|---|---|---|---|---|
| 8,706,852 B2* | 4/2014 | Kunze | G06F 9/5061 | 370/252 |
| 8,954,574 B1* | 2/2015 | Chheda | G06Q 20/085 | 709/220 |
| 9,026,869 B1* | 5/2015 | Li | G06F 11/1004 | 714/718 |
| 9,098,366 B1* | 8/2015 | Adib | G06F 8/61 | |
| 9,424,152 B1* | 8/2016 | Raut | G06F 11/2069 | |
| 2004/0107416 A1* | 6/2004 | Buban | G06F 8/67 | 717/170 |
| 2007/0124474 A1* | 5/2007 | Margulis | G06F 3/14 | 709/226 |
| 2008/0295100 A1* | 11/2008 | Ainsworth | G06Q 10/06 | 718/102 |
| 2009/0182565 A1* | 7/2009 | Erickson | G06Q 10/06 | 705/300 |
| 2011/0125648 A1* | 5/2011 | Price | G06F 21/55 | 705/50 |
| 2011/0178831 A1* | 7/2011 | Ravichandran | G06Q 10/06 | 705/7.11 |
| 2013/0132235 A1* | 5/2013 | Gandhi | G06Q 30/0601 | 705/26.41 |
| 2013/0185339 A1* | 7/2013 | Clay | G06F 17/2205 | 707/821 |
| 2013/0212069 A1* | 8/2013 | Ponsford | G06F 11/1464 | 707/646 |
| 2013/0339519 A1* | 12/2013 | Lientz | H04L 41/0896 | 709/224 |
| 2014/0013249 A1* | 1/2014 | Moeinifar | H04L 51/00 | 715/758 |
| 2014/0122926 A1* | 5/2014 | Bartholomy | G06F 11/14 | 714/15 |
| 2014/0278623 A1* | 9/2014 | Martinez | G06F 8/36 | 705/7.12 |
| 2015/0039930 A1* | 2/2015 | Babashetty | G06F 11/1464 | 714/4.11 |
| 2015/0074644 A1* | 3/2015 | Oberheide | G06F 9/445 | 717/122 |
| 2015/0106520 A1* | 4/2015 | Breitgand | G06F 9/45558 | 709/226 |
| 2015/0149612 A1* | 5/2015 | Banerjee | H04L 41/14 | 709/224 |
| 2015/0207749 A1* | 7/2015 | Cao | H04L 41/0896 | 709/226 |
| 2015/0261792 A1* | 9/2015 | Attarde | G06F 17/30303 | 707/616 |
| 2015/0347683 A1* | 12/2015 | Ansari | H04L 63/08 | 726/7 |
| 2016/0028834 A1* | 1/2016 | Agrawal | H04L 43/087 | 709/224 |
| 2016/0092311 A1* | 3/2016 | Bushman | G06F 11/1446 | 707/646 |
| 2016/0094568 A1* | 3/2016 | Balasubramanian | G06F 9/45558 | 726/23 |
| 2016/0117107 A1* | 4/2016 | Ahuja | G06F 3/0604 | 711/114 |
| 2016/0345187 A1* | 11/2016 | Adderly | H04L 43/16 | |

* cited by examiner

METHOD AND SYSTEM FOR PROVIDING DISASTER RECOVERY SERVICES USING ELASTIC VIRTUAL COMPUTING RESOURCES

BACKGROUND

The golden standard for disaster recovery service are high availability services. High availability services are disaster recovery services that provide zero or near zero recovery time. In other words, if a first system is providing a service to a client and the first system becomes unavailable, a second system is already online or quickly comes online to continue providing the service to the client without an intermediate loss of communications, loss of service, or loss of data for the client. While high availability services are the golden standard, such services come at great expense because high availability services are generally completely redundant systems, even though the redundant system exists for an event, i.e., a disaster, which is highly unlikely to occur.

The opposite extreme of high availability services in disaster recovery is backing up the bare minimum of a primary service, and when a disaster does occur, additional computing resources are gathered, initialized, and brought online. The minimalist implementation of a disaster recovery service is economical when compared to high availability services because all of the resources needed to provide the primary service are not acquired, organized, or existing in standby mode (an essentially unused state) while waiting for a disaster to occur. The obvious downside to the most economic approach of disaster recovery is a prolonged recovery time. Rather than a zero recovery time, most economic disaster recovery models can take several days to bring a service back online. In popular (e.g., Netflix) or important (e.g., Bank of America) services, a recovery time of several days would result in extremely unhappy customers.

What is needed is a method and system for providing disaster recovery services using elastic virtual computing resources, to economically provide disaster recovery services that approximate a high availability service.

SUMMARY

According to one embodiment, the disclosed systems and methods provide disaster recovery services using elastic virtual computing resources, to economically provide disaster recovery services that approximate a high availability service. As used herein, a high-availability service refers to a service that provides zero down-time in the event of a disaster. The systems and methods provide disaster recovery services using elastic virtual computing resources that approximate, but that do not precisely provide, a high-availability service, i.e., zero down-time. In other words, the systems and methods are configured to provide recovery in minutes, tens of minutes, as opposed to the days or weeks that may be consumed in recovering from a disaster using a similar quantity of computing resources under traditional disaster recovery architectures, according to one embodiment. The systems and methods provide financial services to users with applications and application data that is stored in a first computing environment. The systems and methods provide disaster recovery services of the applications and application data by storing secondary copies of data in virtual computing resources that are provided by a second computing environment, e.g., a cloud computing environment, according one embodiment. In the virtual computing resources of the second computing environment, the systems and methods store a resource-light version of the financial services applications, and maintains the applications in a standby mode, e.g., a mode in which the applications do not perform operations on the secondary copies of data stored in the virtual computing resources, according to one embodiment. The secondary copies and the resource-light version of the applications are allocated a small quantity of computing resources, e.g., just enough resources to support the creation and storage of secondary copies and the standby versions of the applications, according to one embodiment. In response to a loss of service or other disaster by the first computing environment, the resource-light version of the applications are configured to create, instantiate, expand, and/or bring up all of the applications and services that were provided to the users from the first computing environment, according to one embodiment. To do so, the systems and methods expand the quantity of virtual resources allocated to the applications and their associated data, according to one embodiment. The secondary copy of data becomes the primary copy of data, according to one embodiment. Because the virtual resource service providers, e.g., cloud service providers, permit on-demand expansion and contraction of virtual computing resource allocations to users of cloud computing services, the primary operations that are hosted from the second computing environment can be collapsed back into a resource-light standby mode, when the services in the first computing environment are restored, according to one embodiment.

According to one embodiment, the disclosed techniques address some of the shortcomings associated with traditional techniques for providing disaster recovery services by providing disaster recovery services using elastic virtual computing resources, to economically provide disaster recovery services that approximate a high availability service, according to one embodiment. As a result, embodiments of the present disclosure improve the technical fields of electronic financial management systems, and data flow and distribution, by employing an economical system for maintaining minimalist recovery information that can be dynamically expanded using public cloud computing services, for the rare times that a loss of service occurs.

Additionally, by minimizing or reducing the amount of effort, time, and cost needed for migrating to a disaster recovery environment, the disclosed techniques provide for significant improvement to the field of finance management, data collection, and data processing. As one illustrative example, by reducing the quantity of redundant computing resources that are in standby until a disaster or other loss of service occurs, implementation of embodiments of the present disclosure enables use of fewer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

Figure 1:
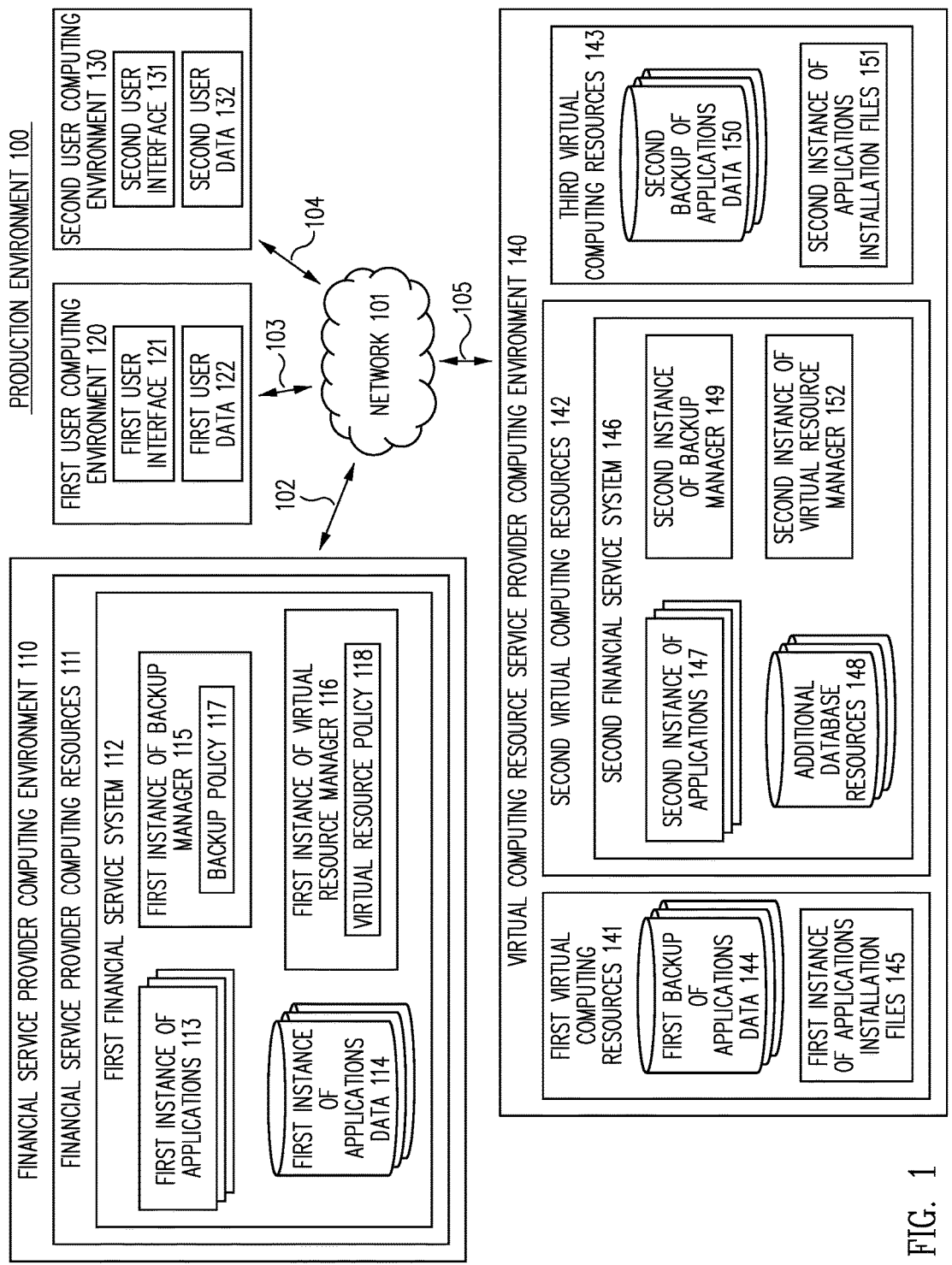
FIG. 1 is a block diagram of a hardware architecture for providing disaster recovery services using elastic virtual computing resources, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, and PROCESS sections herein include systems and processes suitable for providing data recovery services with elastic virtual computing resources, according to various embodiments.

Introductory System

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party. Examples of trusted computing environments include the assets and components making up data centers associated with, and/or controlled by, an application and/or any computing systems and/or virtual assets, and/or networks of computing systems and/or virtual assets, associated with, known by, and/or controlled by, an application.

In contrast, unknown, or untrusted computing environments are environments and systems where the assets, components, infrastructure, communication and networking systems, and security systems implemented and associated with the computing systems and/or virtual assets making up the untrusted computing environment, are not under the control of, and/or are not known by, a party, and/or are dynamically configured with new elements capable of being added that are unknown to the party. Examples of untrusted computing environments include, but are not limited to, public networks, such as the Internet, various cloud-based computing environments, and various other forms of distributed computing systems.

In various embodiments, each computing environment includes allocated assets and virtual assets associated with, and controlled or used to create, and/or deploy, and/or operate an application.

It is often the case that to create, and/or deploy, and/or operate an application, application data must be transferred between an untrusted computing environment and a trusted computing environment. However, in other situations a party may wish to transfer data between two trusted computing environments, and/or two untrusted computing environments.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the terms "virtual asset" and "virtual computing resource" include any virtualized entity or resource, and/or virtualized part of an actual, or "bare metal" entity. In various embodiments, the virtual assets and virtual computing resources can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets or virtual resources.

Typically, virtual assets (or resources) are created, or instantiated, using steps, instructions, processes, code, or "recipes" referred to herein as "virtual asset creation templates." Typically, virtual assets that have the same, or similar, operational parameters are created using the same or similar "virtual asset creation templates."

Examples of virtual asset creation templates include, but are not limited to, any tool and/or system for creating and managing a collection of related cloud resources. Illustrative examples of such a virtual asset creation template are any of the cloud formation templates/tools provided by Amazon Web Service (AWS), Rack Space, Joyent, and/or any other of the numerous cloud based infrastructure providers.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or system or any other fundamental element, or set of elements, used to override the default settings on a node within an infrastructure or architecture.

Other examples of virtual asset creation templates include, but are not limited to, any virtual appliance used to instantiate virtual assets. One specific illustrative example of such a virtual asset creation template is an Amazon Machine Image (AMI), and/or similar functionality provided by Amazon Web Service (AWS), Rack Space, Joyent, and/or any other of the numerous cloud based infrastructure providers.

Other examples of virtual asset creation templates include, but are not limited to, any appliance, or tool, or system, or framework, used to instantiate virtual assets as discussed herein, and/or as known/available in the art at the time of filing, and/or as developed/made available after the time of filing.

Herein virtual assets and virtual resources that have the same, or similar, operational parameters and are created by the same or similar virtual asset creation template are generically referred to as being of the same "class." Examples of virtual classes include, but are not limited to, virtual machine classes; virtual server classes; virtual database or data store classes; self-monitoring virtual assets including specific types of instances instantiated in a cloud environment; application development process classes; and application classes.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "tenant" includes, but is not limited to, any user that enters a relationship, agreement, and/or contract, with an asset service provider or other service provider to receive an allocation of one or more assets or asset resources within an asset computing environment. In some embodiments, the terms "tenant" and "tenant computing environment" are interchangeably used even though, in some cases, a tenant represents a party, parties, or entities while the tenant computing environment represents one or more computing resources that are used by or that are at least partially under the control of the tenant.

Hardware Architecture

FIG. 1 illustrates a block diagram of a production environment 100 for providing disaster recovery services using elastic virtual computing resources, to economically provide disaster recovery services that approximate a high availability service. As used herein, a high-availability service refers to a service that provides zero down-time in the event of a disaster. The production environment 100 is configured to provide disaster recovery services using elastic virtual computing resources that approximate, but that do not precisely provide, a high-availability service, i.e., zero down-time. In other words, the production environment 100 is configured to provide recovery in minutes, tens of minutes, or hours, as opposed to the days or weeks that may be consumed in recovering from a disaster using a similar quantity of computing resources under traditional disaster recovery architectures, according to one embodiment. The production environment 100 provides financial services to users with applications and application data that is stored in a first computing environment. The production environment 100 provides disaster recovery services of the applications and application data by storing secondary copies of data in virtual computing resources that are provided by a second computing environment, e.g., a cloud computing environment, according one embodiment. In the virtual computing resources of the second computing environment, the production environment 100 also stores a resource-light version of the financial services applications, and maintains the applications in a standby mode, e.g., a mode in which the applications do not perform operations on the secondary copies of data stored in the virtual computing resources, according to one embodiment. The secondary copies and the resource-light version of the applications are allocated a small quantity of computing resources, e.g., just enough resources to support the creation and storage of secondary copies and the standby versions of the applications, according to one embodiment. In response to a loss of service by the first computing environment, the resource-light version of the applications are configured to create, instantiate, expand, and/or bring up all of the applications and services that were provided to the users from the first computing environment, according to one embodiment. To do so, the production environment 100 is configured to expand the quantity of virtual resources allocated to the applications and their associated data, according to one embodiment. The secondary copy of data becomes the primary copy of data, according to one embodiment. Because the virtual resource service providers, e.g., cloud service providers, now enable/permit on-demand expansion and contraction of virtual computing resource allocations to users of cloud services, the primary operations that are hosted from the second computing environment can be collapsed back into a resource-light standby mode, when the services in the first computing environment are restored, according to one embodiment.

As discussed above, there are various long standing shortcomings associated with traditional techniques for providing disaster recovery services. Traditional techniques for providing disaster recovery services are either economical and have extraordinarily long recovery time, e.g., days, because the technique employs minimalist computing resources, or the traditional techniques provide high-availability services but are extremely expensive because the technique employs entirely redundant computing resources to support an event, e.g., a disaster, that should seldom or rarely occur. Traditional techniques for providing disaster recovery services can also employ systems that are between the two extremes, however, these mid-range systems are still relatively expensive and have a relatively long recovery time, e.g., multiple hours.

The production environment 100 addresses some of the shortcomings associated with traditional techniques for providing disaster recovery services by providing disaster recovery services using elastic virtual computing resources, to economically provide disaster recovery services that approximate a high availability service, according to one embodiment. As a result, embodiments of the present disclosure improve the technical fields of electronic financial management systems, and data flow and distribution, by employing an economical system for maintaining minimalist recovery information that can be dynamically expanding using public cloud computing services in the rare times that a loss of service occurs.

Additionally, by minimizing or reducing the amount of effort, time, and cost needed for migrating to a disaster recovery environment, the disclosed techniques provide for significant improvement to the field of finance management, data collection, and data processing. As one illustrative example, by reducing the quantity of redundant computing resources that are in standby until a disaster or other loss of service occurs, implementation of embodiments of the present disclosure enables use of fewer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

The production environment 100 includes several computing environments for providing disaster recovery services using elastic virtual computing resources, to economically provide disaster recovery services that approximate a high availability service, according to one embodiment. The production environment 100 includes a financial service provider computing environment 110 that is configured to provide financial services to a first user computing environment 120 and to a second user computing environment 130, according to one embodiment. The production environment 100 also includes a virtual resource service provider computing environment 140 that provides virtual resource services, e.g., public cloud services, to the financial service provider computing environment 110, and which is configured to provide disaster recovery services that operate in a resource-lean environment until a loss of service occurs in the financial service provider computing environment 110, according to one embodiment. The computing environments 110-140 are communicatively coupled to each other through a network 101 and through communications channels 102, 103, 104, and 105, according to one embodiment.

The financial service provider computing environment 110 is configured to provide financial services to the first user computing environment 120 into the second user computing environment 130, according to one embodiment. For example, the financial service provider computing environment 110 provides personal financial management services, business financial management services, or a combination of personal and business financial management services to the user computing environments 120 and 130, according to one embodiment. The financial service provider computing environment 110 includes financial service provider computing resources for hosting a first financial service system 112, which includes a first instance of applications 113 for providing financial services to the user computing environments 120 and 130, according to one embodiment. The financial service provider computing resources 111 include the hardware, software, and firmware used to host the first financial service system 112, and may include tens, hundreds, or thousands of servers, network devices, equipment racks, power supplies, data storage equipment, thermal conditioning equipment, and the like, according to one embodiment. The first instance of applications 113 can include one or more applications that support digital communications, language features, geographic-based features, data processing, data acquisition, graphical user interfaces, financial institution communications connections, information security, network security, database management, document management, and other processes suitable for supporting the delivery of financial services to the user computing environments 120 and 130, according to one embodiment.

The first instance of applications 113 is configured to transmit and receive information with the user computing environment 120 and 130 through the first user interface 121 and the second user interface 131, in one embodiment. For example, the first instance of applications 113 is configured to receive first user data 122 via the first user interface 121 and second user data 132 via the second user interface 131, according to one embodiment.

The first instance of applications data 114 is data storage for the cumulative user data (e.g., the first user data 122 and the second user data 132) that is acquired, calculated, and/or otherwise processed while executing the first instance of applications 113 to provide financial services to the user computing environment 120 and 130, according to one embodiment. The first instance of applications data 114 can be formatted, organized, maintained, and/or stored in one or more tables, databases, and/or other data structures, according to one embodiment. The first instance of applications data 114 includes data associated with each of the one or more first instance of applications 113, and can be implemented in one or more interdependent or independent data structures, e.g., databases, according to various embodiments.

The first financial service system 112 includes a first instance of backup manager 115 and a first instance of virtual resource manager 116 for maintaining and managing disaster recovery resources for the first financial service system 112 within the virtual computing resource service provider computing environment 140, according to one embodiment.

The first financial service system 112 uses the first instance of backup manager 115 to create, update, synchronize, monitor, and/or otherwise manipulate a secondary copy, e.g., a backup copy, of the first instance of applications data 114 within the virtual computing resource service provider computing environment 140, according to one embodiment. The first instance of backup manager 115 is configured to use one or more of a variety of secondary copy techniques for maintaining synchronization between the first instance of applications data 114 and the secondary copy stored on the virtual computing resource service provider computing environment 140. For example, the first instance of backup manager 115 is configured to use a combination of full backup copy, incremental backup copy, and differential backup copy techniques to keep the first instance of applications data 114 synchronized with the secondary copy, according to one embodiment. As used herein, a full backup copy includes a complete system image taken at one or more specific points in time, and the incremental backup copy includes the incremental changes to a data store (e.g., database, non-volatile memory, etc.) that occur between two points in time, and a differential backup copy includes changes that occur to a data store from the time of the last full backup. The first instance of backup manager 115 can also be configured to use the snapshot backup copies in addition to the other types of backup techniques described above, according to one embodiment. A snapshot backup copy includes an "instant" image of a data store at a given point in time, and may include state and/or status information relative to an application that manages the application data, according to one embodiment. In one particular embodiment, the first instance of backup manager 115 is configured to transmit incremental backup copies of the first instance of applications data 114 through the network 101 to the virtual computing resource service provider computing environment 140 every several minutes, e.g., every 5 minutes, or in another predetermined period of time, so that the recovery point for disaster recovery of the first instance of applications data 114 is less than, for example, 5-10 minutes, according to one embodiment.

The first instance of backup manager 115 uses a backup policy 117 to apply backup preferences for the first instance of applications data 114 to a secondary copy stored in the virtual computing resource service provider computing environment 140, according to one embodiment. The backup policy 117 specifies a frequency, a type, a destination, a source, and other characteristics of each backup copy, according to one embodiment.

The first financial service system 112 uses the first instance of virtual resource manager 116 to manage the virtual computing resources that are allocated to the first financial service system 112 within the virtual computing resource service provider computing environment 140, according to one embodiment. The first instance of virtual resource manager 116 executes a virtual resource policy 118 to rent, instantiate, maintain, expand, and/or release quantities of virtual computing resources allocated for the use of the first financial service system 112 within the virtual resource service provider computing environment 140, according to one embodiment. In other words, the first instance of the virtual resource manager 116 executes the virtual resource policy 118 to ensure that sufficient virtual computing resources (e.g., number of processors, quantity of volatile memory, quantity of non-volatile memory, and/or network bandwidth) are reserved for or are allocated to the financial service provider as disaster recovery resources, according to one embodiment.

The virtual computing resource service provider computing environment 140 that provides elastic quantities of virtual computing resources to tenants, such as the financial service provider or other individuals or organizations that enters a relationship with the virtual computing resource service provider to receive use of virtual computing resources, according to one embodiment. The virtual computing resource service provider computing environment 140 is illustrated as including first virtual computing resources 141, second virtual computing resources 142, and third virtual computing resources 143, according to one embodiment. Each of the virtual computing resources 141, 142, and 143 are an allocation of one or more hardware, software, and/or firmware resources to the financial service provider (a "tenant" of the virtual computing resource service provider computing environment 140), according to one embodiment. The hardware, software, and/or firmware resources can be shared (e.g., allocated to or shared by multiple tenants), or the resources can be dedicated (e.g., allocated to a single tenant), according to one embodiment. The virtual computing resources 141, 142, and 143 can include any virtualized entity or resource, and/or virtualized part of an actual, or "bare metal" entity. In various embodiments, the virtual computing resources 141, 142, and 143 include, but are not limited to, one or more virtual machines; virtual servers; instances implemented in a cloud computing environment; databases associated with a cloud computing environment; databases implemented in a cloud computing environment; services associated with, and/or delivered through, a cloud computing environment; communications systems that are used with, part of, or provided through, a cloud computing environment; and/or any other virtualized assets and/or sub-systems of "bare metal" physical devices.

The first virtual computing resources 141 represent virtual computing resources allocated to the financial service provider for hosting a minimalist, economical, and/or light-weight quantity of virtual computing resources for supporting copies of the first instance of applications 113 and copies of the first instance of applications data 114, according to one embodiment. In other words, the first virtual computing resources 141 host/provide the disaster recovery system for the first financial service system 112, according to one embodiment. The first virtual computing resources 141 represent less computing resources than the financial service provider computing resources 111 that are used to host the first financial service system 112, according to one embodiment. By way of example, the financial service provider computing resources 111 may include 50-100 servers and their associated storage devices. By contrast, the first virtual computing resources 141 may be limited to virtual computing resources that are equivalent to 5-10 servers and their associated storage devices. Accordingly, the allocation of the first virtual computing resources 141 represent a significantly smaller consumption of computing resources than the financial service provider computing resources 111, according to one embodiment.

The configuration of the first virtual computing resources 141 for providing disaster recovery resources for the first financial service system 112 includes several advantages, according to one embodiment. Because the first virtual computing resources 141 are smaller than the financial service provider computing resources 111, the costs associated with maintaining the disaster recovery services/site are significantly lower than the costs associated with maintaining the hardware, software, and firmware for supporting the first financial service system 112, according to one embodiment. As described above, traditional disaster recovery systems that operate on minimalistic, reduced, and/or light-weight quantities of computing resources, the secondary copies of application data may be preserved in the event of a disaster, e.g., loss of service, but, the recovery time for restoring services may be on the order of multiple hours, days, or longer. Therefore, when a traditional disaster recovery system is implemented on light-weight quantities of computing resources, recovery time is sacrificed in exchange for reduced cost. By contrast, as discussed hereafter, the first virtual computing resources 141 represent a light-weight allocation of virtual computing resources that are immediately, quickly, or expeditiously expanded into quantities of computing resources that are needed to continue providing financial services to the user computing environments 120 and 130 through the network 101, according to one embodiment. In one embodiment, the virtual computing resources are immediately, quickly, or expeditiously expanded into quantities of computing resources that are equivalent to or in excess of the financial service provider computing resources 111, according to one embodiment. While the cost of the rent, lease, loan, and/or allocation of virtual computing resources increases during the expansion of virtual computing resources, implementation of the disclosed embodiments may result in a recovery time of 20 minutes or less, which is significantly closer to high-availability services (e.g., zero recovery time) than 24 hours or more that may elapse when using traditional disaster recovery techniques and/or architectures, according to one embodiment.

The first virtual computing resources 141 include a first backup of applications data 144 and a first instance of applications installation files 145, according to one embodiment. The first backup of applications data 144 and the first instance of applications installation files 145 constitute the disaster recovery system for the first financial service system 112, according to one embodiment. The first backup of applications data 144 is the secondary copy of the first instance of applications data 114 that is received by the first virtual computing resources 141 from the first financial service system 112, in one embodiment. The first backup of applications data 144 is initialized, updated, synchronize, and/or maintained by the first instance of backup manager 115, as described above, according to one embodiment.

The first instance of applications installation files 145 represents one or more executable files that are installed, unpacked, initialized, and/or instantiated in the virtual computing resource service provider computing environment 140, in response to a disaster, loss of service, or loss of communications occurring within the financial service provider computing environment 110, within the financial service provider computing resources 111, or within the first financial service system 112, according to various embodiments. The first instance of applications installation files 145 include a light-weight or reduced feature-set instance of the first instance of applications 113 in addition to one or more executable files that can be installed to replicate a full-featured version of the first instance of applications 113, according to one embodiment. The first instance of applications installation files 145 include information and files for creating an additional instance of the first financial service system 112 and expanding virtual computing resource allocations to support the additional instance of the first financial service system 112 on the virtual computing resource service provider computing environment 140, according to one embodiment. In particular, the first instance of application installation files 145 include information and files for: creating an additional instance of the first instance of applications 113, allocating additional resources from the virtual computing resource service provider computing environment 140, creating an additional instance of the first instance of backup manager 115, and creating an additional instance of the first instance of virtual resource manager 116, according to one embodiment.

The first instance of applications installation files 145, or another component within the first virtual computing resources 141, is configured to monitor the first financial service system 112 for indications of a disaster, according to one embodiment. An indication of a disaster includes, but is not limited to, a detected loss of communications between the first virtual computing resources 141 and the first financial service system 112, according to one embodiment. For example, the first financial service system 112 can be configured to transmit a heartbeat signal to the first virtual computing resources 141 through short message service ("SMS"), through a secured connected, or through a public broadcast such as the internet, according to various embodiments. The first instance of application installation files 145, or another component within the first virtual computing resources (i.e., the disaster recovery system) is configured to begin installing a second financial service system 146 on the second virtual computing resources 142 if a loss of service or loss of communications occurs with the first financial service system 112 for a predetermined period of time, e.g., 2 minutes, 3 minutes, 4 minutes, etc., according to one embodiment.

The second virtual computing resources 142 represent the expansion of virtual computing resources by the first instance of applications installation files 145, in response to a disaster, loss of service, or loss of communications occurring within the financial service provider computing resources 111 or within the first financial service system 112, according to one embodiment. The second virtual computing resources 142 are greater than the first virtual computing resources 141, according to one embodiment. The second virtual computing resources 142 in addition to the first virtual computing resources 141 are approximately equivalent to the financial service provider computing resources 111, in one embodiment. The second virtual computing resources 142 include a second financial service system 146, which is another instance of the first financial service system 112, according to one embodiment the second financial service system 146 includes a second instance of applications 147, additional database resources 148, and a second instance of backup manager 149, according to one embodiment. The second instance of applications 147 is another instance of the one or more applications of the first instance of applications 113, according to one embodiment. The second instance of applications 147 and/or the first instance of applications installation files 145 are configured to resume delivery of financial services to the user computing environments 120 and 130, according to one embodiment. The additional database resources 148 include additional servers, and data storage, power resources, facilities, and other hardware, software, and firmware for hosting the second instance of applications 147 from the virtual computing resource service provider computing environment 140, according to one embodiment.

In response to a disaster, a loss of service, or a loss of communications occurring within the financial service provider computing resources 111 or within the first financial service system 112, the first backup of applications data 144 and the additional database resources 148 are converted from a secondary role to a primary role for storing, organizing, receiving, and retrieving data to support the operations of the second instance of applications 147, according to one embodiment. Because the backup copy of applications data becomes the primary copy of applications data, the second instance of backup manager 149 is configured to create an additional backup copy of the first backup of applications data 144, according to one embodiment. The second instance of backup manager 149 can be configured to execute the backup policy 117 to apply secondary copy preferences to the additional backup copy. In one embodiment, the second instance of backup manager 149 creates a secondary copy of the first backup of applications data 144 in the third virtual computing resources 143 as a second backup of applications data 150, according to one embodiment. The second instance of backup manager 149 is configured to initialize, synchronize, update, and otherwise maintain the second backup of applications data 150, based on the first backup of applications data 144, which operates as a primary data store or data structure for the second instance of applications 147, according to one embodiment.

The second instance of virtual resource manager 152 is an additional instance of the first instance of virtual resource manager 116 and is configured to manage the resources allocated to the first virtual computing resources 141, to the second virtual computing resources 142, and to the third virtual computing resources 143, according to one embodiment.

The third virtual computing resources 143 includes the second backup of applications data 150 and includes a second instance of applications installation files 151, according to one embodiment. The third virtual computing resources 143 are configured to provide disaster recovery services to the second financial service system 146, according to one embodiment. The third virtual computing resources 143 are geographically separated from the second virtual computing resources 142 and/or from the first virtual computing resources 141, according to one embodiment. The third virtual computing resources 143 are configured to operate on power supplies, environment conditioning, networks, hardware, software, and/or firmware that is independent of the computing resources used by the first virtual computing resources 141 and the second virtual computing resources 142, so that if a disaster befalls the second financial service system 146, the third virtual computing resources 143 can expand, replicate itself, and resume delivery of financial services to the user computing environments 120 and 130, according to one embodiment.

The virtual computing resources used by the second financial service system 146 and the second backup of applications data 150 are elastic, and can therefore be released, removed, or otherwise returned to an unallocated state when the first financial service system 112 returns to service, according to one embodiment. For example, if the first financial service system 112 in the financial service provider computing environment 110 is returned to service, for example, 48 hours or 72 hours after a disaster/loss of service, the first instance of applications data 114 can be synchronized to the first backup of applications data 144 and can be returned to its capacity as the primary copy of applications data, according to one embodiment. Similarly, the second financial service system 146 is configured to relinquish control to the first financial service system 112 for providing financial services to the user computing environments 120 and 130, according to one embodiment. After the first financial service system 112 is fully restored or operational, the first instance of virtual resource manager 116 may be configured to delete, terminate, and/or release the second virtual computing resources 142 and the third virtual computing resources 143 back to the virtual computing resource service provider computing environment 140, according to one embodiment. As a result, the first virtual computing resources 141 return to providing disaster recovery services in an economical and a reduced computing resource environment, according to one embodiment.

In one embodiment, the first financial service system 112 is hosted in a traditional data center, and the disaster recovery backup data and applications/installation files are hosted by the virtual computing resource service provider computing environment.

In one embodiment, the first financial service system 112 is hosted in a traditional data center for a first set of users (e.g., the first user computing environment 120) but not for a second set of users (e.g., the second user computing environment 130), and the disaster recovery backup data and the applications/installation files are hosted by the virtual computing resource service provider computing environment for the second set of users but not for the first set of users.

In one embodiment, the first financial service system 112 is hosted by a first set of virtual computing resources, the disaster recovery backup data and applications/installation files are hosted by a second set of virtual computing resources, and the first set of virtual computing resources is located in a different geographical region than the second set of virtual computing resources.

In one embodiment, a first set of virtual computing resources located in a different geographical region than a second set of virtual computing resources, the first financial service system 112 is hosted by the first set of virtual computing resources for a first set of users, and the disaster recovery backup data and applications/installation files are hosted by the second set of virtual computing resources for the second set of users.

Process

Figure 2:
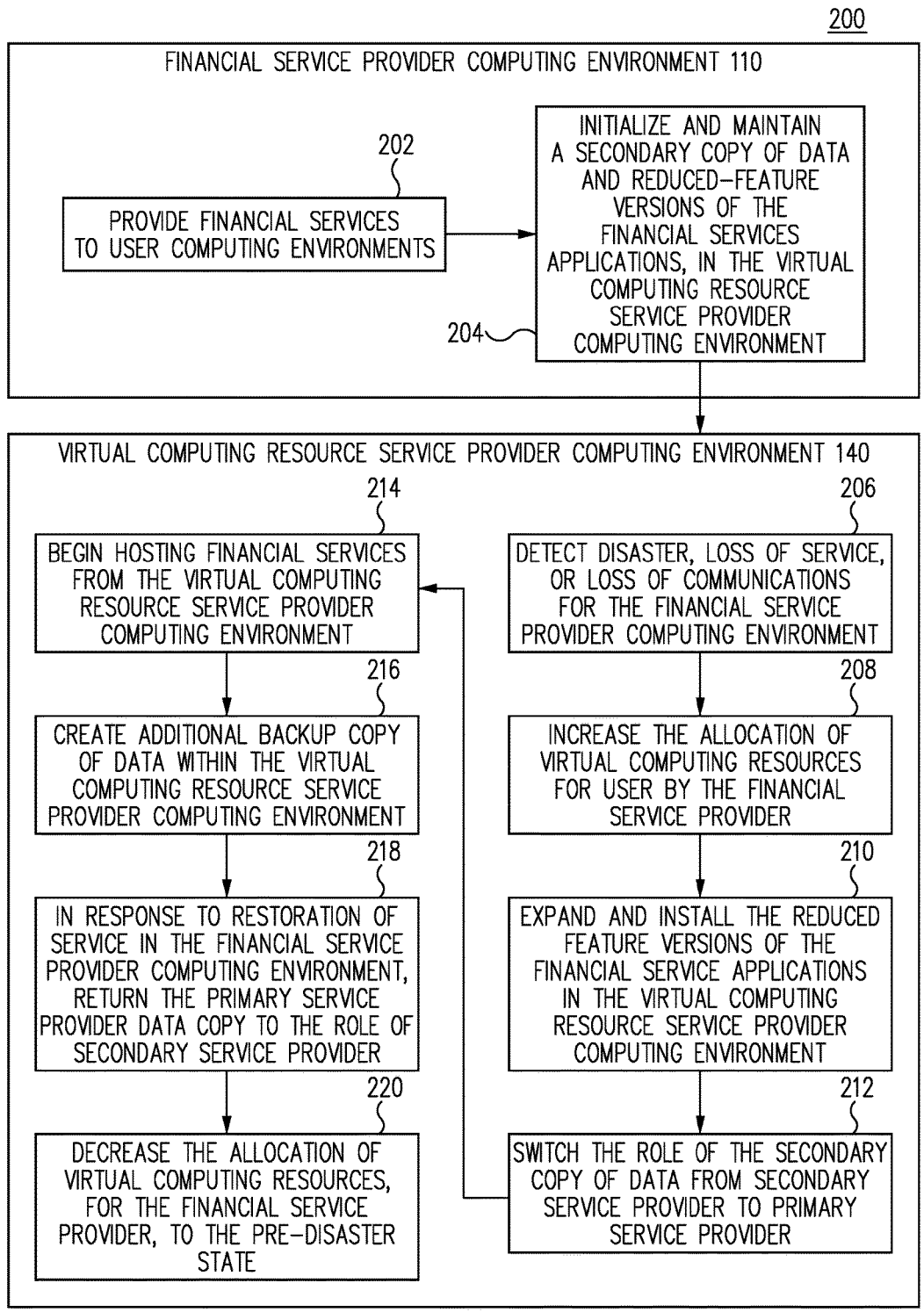
FIG. 2 is a flow chart of a process for providing disaster recovery services with elastic virtual computing resources, in accordance with one embodiment.

FIG. 2 illustrates a functional flow diagram of a process 200 for providing disaster recovery services using elastic virtual computing resources, to economically provide disaster recovery services that approximate a high availability service, according to one embodiment.

At block 202, a financial service provider computing environment provides financial services to user computing environments, according to one embodiment.

At block 204, the financial service provider computing environment initializes and maintains a secondary copy of data and reduced-feature versions of the financial services applications, in the virtual computing resource service provider computing environment, according to one embodiment.

At block 206, the virtual computing resource service provider computing environment detects a disaster, loss of service, or loss of communications for the financial service provider computing environment, according to one embodiment.

At block 208, the virtual computing resource service provider computing environment increases the allocation of virtual computing resources for use by the financial service provider, according to one embodiment.

At block 210, the virtual computing resource service provider computing environment expands and installs the reduced-feature versions of the financial services applications within the virtual computing resource service provider computing environment, according to one embodiment.

At block 212, the virtual computing resource service provider computing environment switches the role of the secondary copy of data from secondary service provider to primary service provider, according to one embodiment.

At block 214, the virtual computing resource service provider computing environment begins hosting financial services from the virtual computing resource service provider computing environment, according to one embodiment.

At block 216, the virtual computing resource service provider computing environment creates additional backup copies of data within the virtual computing resource service provider computing environment, according to one embodiment.

At block 218, in response to restoration of services in the financial service provider computing environment, the virtual computing resource service provider computing environment returns the primary service provider data copy to the role of secondary service provider, according to one embodiment.

At block 220, the virtual computing resource service provider computing environment decreases the allocation of virtual computing resources, for the financial service provider, to the pre-disaster state, according to one embodiment.

Figure 3:
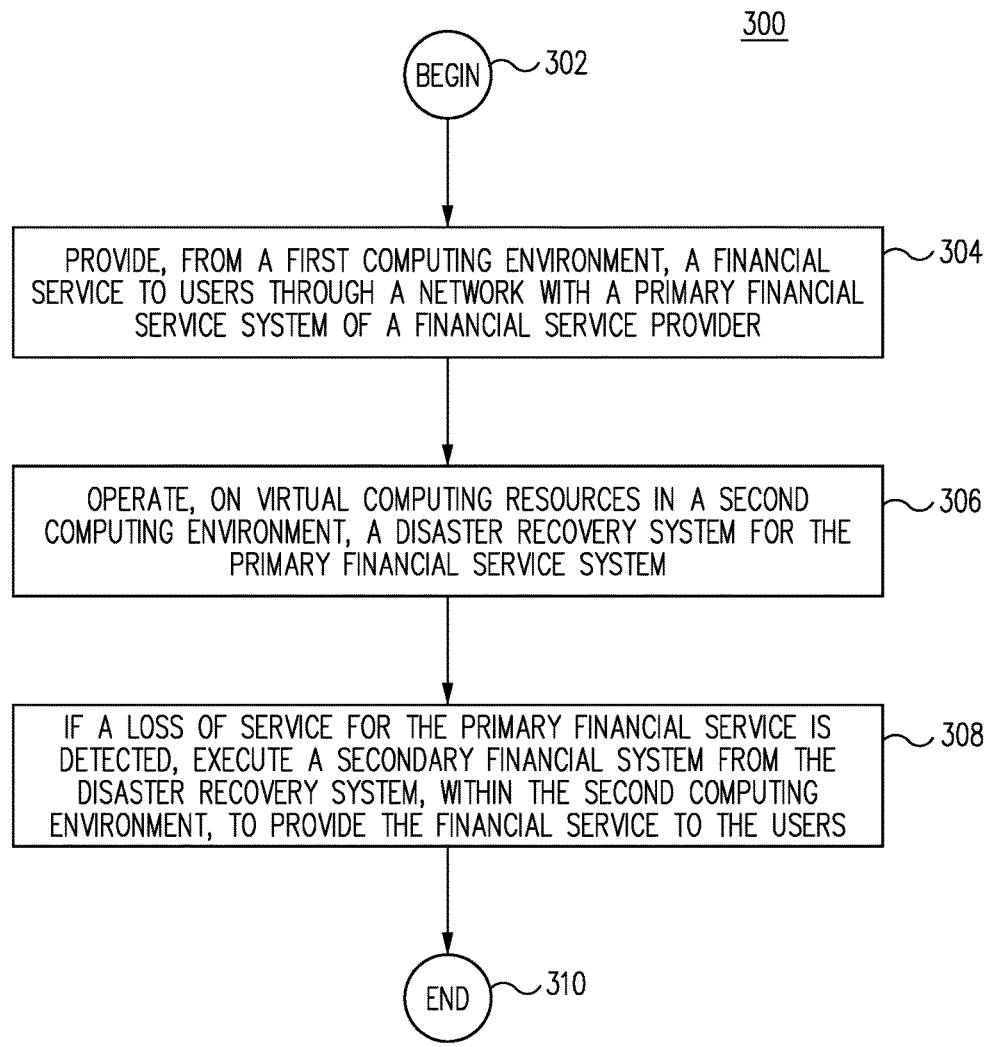
FIG. 3 is a flow diagram for providing data recovery services with elastic virtual computing resources, in accordance with one embodiment.

FIG. 3 illustrates a flow diagram of a process 300 for providing disaster recovery services using elastic virtual computing resources, to economically provide disaster recovery services that approximate a high availability service, according to one embodiment.

At block 302, the process begins.

At block 304, the process provides, from a first computing environment, a financial service to users through a network with a primary financial service system of a financial service provider, according to one embodiment. The primary financial service system provides the financial service to the users with one or more financial service applications and with an applications data storage, e.g., a hard drive and/or a database, according to one embodiment.

At block 306, the process operates, on virtual computing resources in a second computing environment, a disaster recovery system for the primary financial service system, according to one embodiment. The second computing environment is a virtual computing resources service provider computing environment (e.g., a cloud services provider) that provides requested quantities of virtual computing resources to the disaster recovery system in exchange for payment, e.g., from the financial service provider, according to one embodiment.

At block 308, if a loss of service for the primary financial service is detected, the process executes a secondary financial system from the disaster recovery system, within the second computing environment, to provide the financial service to the users, according to one embodiment. Executing the secondary financial system from the disaster recovery system includes, but is not limited to, allocating additional virtual computing resources to the disaster recovery system within the second computing environment; executing the financial service applications within the second computing environment; and using a secondary copy of the applications data storage to support the execution of the financial service applications within the second computing environment, according to one embodiment.

At block 310, the process ends.

As noted above, the specific illustrative examples discussed above are but illustrative examples of implementations of embodiments of the method or process flow diagram of a process 300 for providing disaster recovery services using elastic virtual computing resources, to economically provide disaster recovery services that approximate a high availability service. Those of skill in the art will readily recognize that other implementations and embodiments are possible. Therefore the discussion above should not be construed as a limitation on the claims provided below.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

According to one embodiment, a computing system implemented method provides disaster recovery services in an expandable environment of virtual computing resources. The method includes providing, from a first computing environment, a financial service to users through a network with a primary financial service system of a financial service provider, according to one embodiment. The primary financial service system includes one or more financial service applications and applications data storage that receives, stores, and retrieves applications data to support operations of the one or more financial service applications, according to one embodiment. The method includes operating, on a first set of virtual computing resources in a second computing environment, a disaster recovery system for the primary financial service system, according to one embodiment. The second computing environment is a virtual computing resources service provider computing environment that provides requested quantities of virtual computing resources for use by the disaster recovery system, in exchange for payment from the financial service provider, according to one embodiment. The disaster recovery system maintains a secondary copy of the applications data storage, according to one embodiment. If a loss of service for the primary financial service system is detected, the method includes executing a secondary financial system from the disaster recovery system, within the second computing environment, to provide the financial service to the users, according to one embodiment. Executing the secondary financial system includes: allocating a second set of virtual computing resources to the disaster recovery system within the second computing environment; executing the one or more financial service applications within the second computing environment; and using the secondary copy of the applications data storage to support the execution of the one or more financial service applications within the second computing environment, according to one embodiment.

According to one embodiment, a computing system implemented method provides disaster recovery services in cloud computing environment having dynamically allocateable virtual computing resources. The method includes hosting a disaster recovery system on a first set of computing resources in a first computing environment, according to one embodiment. The first set of computing resources are a first set of virtual computing resources, according to one embodiment. The disaster recovery system is for a primary financial service system that operates on a second set of computing resources in a second computing environment, to provide financial services to users, according to one embodiment. The first set of computing resources is smaller than the second set of computing resources, and hosting the disaster recovery system includes maintaining a secondary copy of data for the primary financial service system with the first set of computing resources, according to one embodiment. The method includes monitoring, with the disaster recovery system, the primary financial service system for a loss of service event, according to one embodiment. The method includes hosting a secondary financial service system on a third set of computing resources, in response to detecting the loss of service event, with the disaster recovery system, for the primary financial service system, according to one embodiment. Hosting the secondary financial service system includes allocating the third set of computing resources to use by the secondary financial service system, according to one embodiment. The third set of computing resources are a second set of virtual computing resources, and the secondary financial service system uses the secondary copy of data to provide the financial service to the users, according to one embodiment.

According to one embodiment, a system provides disaster recovery services in an expandable environment of virtual computing resources. The system includes at least one processor, according to one embodiment. The system includes at least one memory coupled to the at least one processor, the at least one memory having stored therein instructions which, when executed by any set of the one or more processors, perform a process for providing disaster recovery services in an expandable environment of virtual computing resources, according to one embodiment. The process includes providing, from a first computing environment, a financial service to users through a network with a primary financial service system of a financial service provider, according to one embodiment. The primary financial service system includes one or more financial service applications and applications data storage that receives, stores, and retrieves applications data to support operations of the one or more financial service applications, according to one embodiment. The process includes operating, on a first set of virtual computing resources in a second computing environment, a disaster recovery system for the primary financial service system, according to one embodiment. The second computing environment is a virtual computing resources service provider computing environment that provides requested quantities of virtual computing resources for use by the disaster recovery system, in exchange for payment from the financial service provider, according to one embodiment. The disaster recovery system maintains a secondary copy of the applications data storage, according to one embodiment. If a loss of service for the primary financial service system is detected, the process includes executing a secondary financial system from the disaster recovery system, within the second computing environment, to provide the financial service to the users, according to one embodiment. Executing the secondary financial system includes: allocating a second set of virtual computing resources to the disaster recovery system within the second computing environment; executing the one or more financial service applications within the second computing environment; and using the secondary copy of the applications data storage to support the execution of the one or more financial service applications within the second computing environment, according to one embodiment.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for providing disaster recovery services in an expandable computing environment of virtual computing resources that are dynamically and elastically allocated within the expandable computing environment, comprising:
  providing, from a first computing environment, a financial service to users through a network with a primary financial service system of a financial service provider, wherein the primary financial service system includes a financial service application executing over a first number of servers and application data storage that receives, stores, and retrieves application data to support operations of the financial service application;

operating, on a first set of virtual computing resources in a second computing environment, a disaster recovery system for the primary financial service system, wherein the second computing environment is a virtual computing resources service provider computing environment that provides requested quantities of virtual computing resources for use by the disaster recovery system, in exchange for payment from the financial service provider, the second computing environment continuously executing a limited-feature version of the financial services application over less than the first number of servers, the limited-feature version of the financial services application being configured to perform a feature set having a fewer number of features than a full feature version of the application, wherein the disaster recovery system maintains a secondary copy of the application data storage; and if a loss of service for the primary financial service system is detected, executing a secondary financial system from the disaster recovery system, within the second computing environment, to provide the financial service to the users, wherein executing the secondary financial system includes:

allocating a second set of virtual computing resources to the disaster recovery system within the second computing environment, the allocation including increasing the number of servers over which the financial services application is executing from less than the first number of servers to at least a number of servers exceeding the first number of servers;

updating the already-executing limited feature application to a full feature application executing within the second computing environment, the full feature application being updated from the limited feature set version of the application to perform a full feature set having a greater number of features than the limited feature version of the application, and using the secondary copy of the application data storage to support the execution of the financial service application within the second computing environment.

2. The method of claim 1, wherein the second computing environment is a cloud computing environment that provides an on-demand elastic allocation of the virtual computing resources.

3. The method of claim 1, wherein the primary financial service system consumes a first set of computing resources, the disaster recovery system consumes a second set of computing resources, and the second set of computing resources is smaller than the first set of computing resources.

4. The method of claim 1, wherein the disaster recovery system includes installation files for the financial service application, wherein executing the financial service application within the second computing environment includes installing the application in the second computing environment.

5. The method of claim 4, wherein installing the application in the second computing environment includes installing the application in the second set of virtual computing resources allocated to the disaster recovery system as part of executing the secondary financial system.

6. The method of claim 1, wherein executing the secondary financial system includes creating a third copy of the secondary copy of the application data storage in a third set of virtual computing resources within the second computing environment.

7. The method of claim 6, wherein the third set of virtual computing resources uses hardware, power, and physical network resources that are independent from the hardware, power, and physical network resources of the first and second sets of virtual computing resources.

8. The method of claim 6, wherein the disaster recovery system is a first disaster recovery system, wherein the third set of virtual computing resources includes a second disaster recovery system for the second financial system.

9. The method of claim 1, wherein the primary financial service system includes a backup manager that is configured to generate the secondary copy of the application data storage in the disaster recovery system by transmitting incremental backup copies to the disaster recovery system.

10. The method of claim 9, wherein the incremental backup copies include differences in the application data store between two points in time.

11. The method of claim 9, wherein the backup manager transmits incremental backup copies to the disaster recovery system approximately every 5 minutes to maintain recovery points in 5 minute increments.

12. The method of claim 9, wherein the backup manager transmits incremental backup copies to the disaster recovery system to maintain recovery points that have less than 10 minute increments.

13. The method of claim 1, wherein the disaster recovery system monitors the primary financial service system for loss of communications and for loss of service, wherein the disaster recovery system determines loss of service has occurred for the primary financial service system if the disaster recovery system fails to receive communications from the primary financial service system within a predetermined period of time.

14. The method of claim 13, wherein the predetermined period of time is less than 5 minutes.

15. The method of claim 1, further comprising:

de-allocating the second set of virtual computing resources, in response to a return of service by the primary financial service system.

16. A computing system implemented method for providing disaster recovery services in cloud computing environment having dynamically allocateable virtual computing resources, comprising:

hosting a disaster recovery system on a first set of computing resources in a first computing environment, wherein the first set of computing resources are a first set of virtual computing resources, the second computing environment continuously executing a limited-feature version of a financial services application over less than a first number of servers, the limited-feature version of the financial services application being configured to perform a limited feature set having a fewer number of features than a full feature version of the application, wherein the disaster recovery system is for a primary financial service system executing over the first number of servers and that operates on a second set of computing resources in a second computing environment, to provide financial services to users, wherein the first set of computing resources is smaller than the second set of computing resources, wherein hosting the disaster recovery system includes maintaining a secondary copy of data for the primary financial service system with the first set of computing resources;

monitoring, with the disaster recovery system, the primary financial service system for a loss of service event; and hosting a secondary financial service system on a third set of computing resources, in response to detecting the loss of service event, with the disaster recovery system, for the primary financial service system, wherein hosting the secondary financial service system includes allocating the third set of computing resources to use by the secondary financial service system, the allocation including increasing the number of servers over which the financial services application is executing from less than the first number of servers to at least a number of servers exceeding the first number of servers, wherein the third set of computing resources are a second set of virtual computing resources, wherein the secondary financial service system uses the secondary copy of data to provide the financial service to the users;

updating the already-executing limited feature application to a full feature application, the full feature application being updated from the limited feature set version of the application to perform a full feature set having a greater number of features than the limited feature version of the application.

17. The method of claim 16, wherein the first computing environment is different than the second computing environment and the second computing environment is a traditional data center.

18. The method of claim 16, further comprising:

de-allocating the third computing resources to return control over the third computing resources to a pool of computing resources for the first computing environment.

19. A system for providing disaster recovery services in an expandable environment of virtual computing resources, the system comprising:

at least one processor; and at least one memory coupled to the at least one processor, the at least one memory having stored therein instructions which, when executed by any set of the at least one processors, perform a process for providing disaster recovery services in an expandable environment of virtual computing resources, the process including:

providing, from a first computing environment, a financial service to users through a network with a primary financial service system of a financial service provider, wherein the primary financial service system includes a financial service application executing over a first number of servers and application data storage that receives, stores, and retrieves application data to support operations of a financial service application;

operating, on a first set of virtual computing resources in a second computing environment, a disaster recovery system for the primary financial service system, wherein the second computing environment is a virtual computing resources service provider computing environment that provides requested quantities of virtual computing resources for use by the disaster recovery system, in exchange for payment from the financial service provider, the second computing environment continuously executing a limited-feature version of the financial services application over less than the first number of servers, the limited-feature version of the financial services application being configured to perform a limited feature set having a fewer number of features than the full feature version of the application, wherein the disaster recovery system maintains a secondary copy of the application data storage; and if a loss of service for the primary financial service system is detected, executing a secondary financial system from the disaster recovery system, within the second computing environment, to provide the financial service to the users, wherein executing the secondary financial system includes:

allocating a second set of virtual computing resources to the disaster recovery system within the second computing environment, the allocation including increasing the number of servers over which the financial services application is executing from the less than a first number of servers to at least a number of servers exceeding the first number of servers;

updating the already-executing limited feature application to a full feature application, the full feature application being updated from the limited feature set version of the application to perform a full feature set having a greater number of features than the limited feature version of the application;

executing the financial service application within the second computing environment, and using the secondary copy of the application data storage to support the execution of the financial service application within the second computing environment.

20. The system of claim 19, wherein the second computing environment is a cloud computing environment.

21. The system of claim 19, wherein the primary financial service system consumes a first set of computing resources, the disaster recovery system consumes a second set of computing resources, and the second set of computing resources is smaller than the first set of computing resources.

22. The system of claim 19, wherein the disaster recovery system includes installation files for the financial service application, wherein executing the financial service application within the second computing environment includes installing the application in the second computing environment.

23. The system of claim 22, wherein installing the application in the second computing environment includes installing the application in the second set of virtual computing resources allocated to the disaster recovery system as part of executing the secondary financial system.

24. The system of claim 19, wherein executing the secondary financial system includes creating a secondary copy of the secondary copy of the application data storage in a third set of virtual computing resources within the second computing environment.

25. The system of claim 24, wherein the third set of virtual computing resources uses hardware, power, and physical network resources that are independent from the hardware, power, and physical network resources of the first and second sets of virtual computing resources.

26. The system of claim 24, wherein the disaster recovery system is a first disaster recovery system,
   wherein the third set of virtual computing resources includes a second disaster recovery system for the second financial system.

27. The system of claim 19, wherein the primary financial service system includes a backup manager that is configured to generate the secondary copy of the application data storage in the disaster recovery system by transmitting incremental backup copies to the disaster recovery system.

28. The system of claim 27, wherein the incremental backup copies include differences in the application data store between two points in time.

29. The system of claim 27, wherein the backup manager transmits incremental backup copies to the disaster recovery system approximately every 5 minutes to maintain recovery points in 5 minute increments.

30. The system of claim 27, wherein the backup manager transmits incremental backup copies to the disaster recovery system to maintain recovery points that have less than 10 minute increments.

31. The system of claim 19, wherein the disaster recovery system monitors the primary financial service system for loss of communications and for loss of service,
   wherein the disaster recovery system determines loss of service has occurred for the primary financial service system if the disaster recovery system fails to receive communications from the primary financial service system within a predetermined period of time.

32. The system of claim 31, wherein the predetermined period of time is less than 5 minutes.

33. The system of claim 19, wherein the process further comprises:
   de-allocating the second set of virtual computing resources, in response to a return of service by the primary financial service system.

* * * * *